Patented May 24, 1949

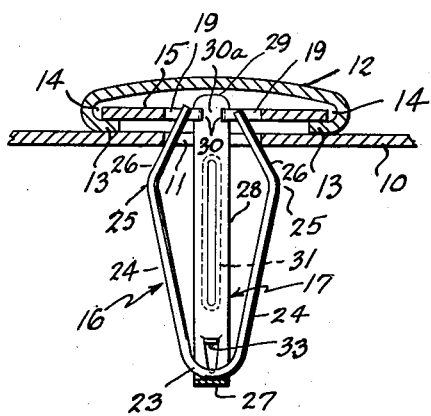
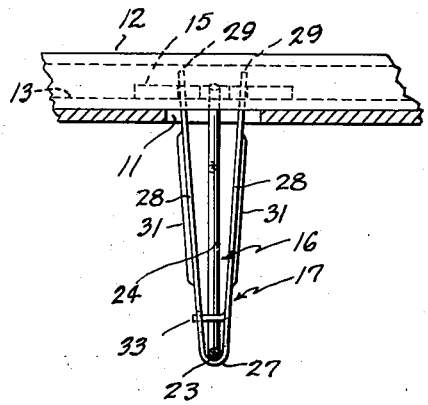
Fig.1.  Fig.2.
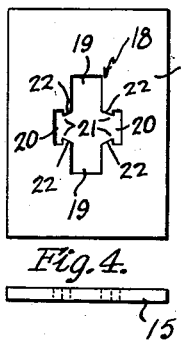
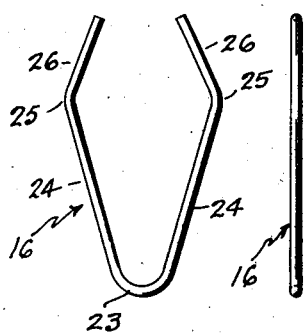
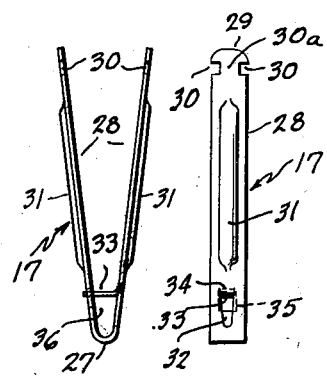
Fig.4. Fig.5. Fig.6. Fig.7. Fig.8. Fig.9.
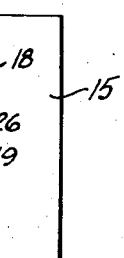
Fig.3.
Inventor
John Stadler
By Worster & Davis Attorneys.

2,471,247

UNITED STATES PATENT OFFICE 2,471,247

CLIP FOR ATTACHING MOLDING TO AUTOMOBILE BODIES AND FENDERS

John Stadler, Long Hill, Conn.

Application August 25, 1948, Serial No. 46,106

6 Claims. (Cl. 24—213)

This invention relates to a clip for attaching moldings to automobile bodies and fenders, and has for an object to provide a simple and improved construction of clip for this purpose which may be easily assembled and applied to the molding, and which will be substantially universal in that it may be used with all types and sizes of moldings.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a section through a molding and a portion of the body or fender of a car showing the clip in place, the scale being somewhat enlarged;

Fig. 2 is a longitudinal section of the clip and molding of Fig. 1;

Fig. 3 is a top plan view of the clip on a larger scale;

Figs. 4 and 5 are a top plan and edge view respectively of the clamping plate of the clip;

Figs. 6 and 7 are a side and edge view respectively of the wire camming spring, and Figs. 8 and 9 are an edge and side view respectively of the retaining spring.

In Figs. 1 and 2 a portion of an automobile body or fender is shown at 10 provided with an opening 11 which may be either a round or rectangular opening, and a strip of molding is shown at 12 which is usually formed from a strip of heavy gauge sheet metal, and chrome plated on its outer surface, with inturned flanges 13 along its free edges and bent inwardly under the body portion, but spaced therefrom as shown at 14.

Practically each make of automobile has a different clip for fastening these moldings to the body or fender, and for this reason body repair men have difficulty in obtaining the proper clips in making repairs or applying molding. The present construction is practically universal in that it can be used with all these various sizes and shapes of molding by merely using clamping plates of different widths. These plates can be kept in stock and these elements of the clip assembled in the proper plate for use with different moldings.

This clip comprises only three elements, the the clamping plate 15, the cam spring 16, and retaining spring 17. The plate 15 is a rectangular member of relatively heavy gauge strip or sheet metal, and when in place in the molding 12 overlaps at its opposite ends the inturned flanges 13 of the molding with its end edges seated in the spaces 14, as shown in Fig. 1. It is provided with a generally cross-shaped opening 18 including the end notches or recesses 19 and the side notches or recesses 20. The entrances to the notches 20 from the connecting portion of the notches 19 may be straight if desired, but it is preferred to provide on the opposite edges of these notches inwardly extending holding lugs or points 21 and inclined surfaces 22 leading to them for a purpose presently to be described.

The camming spring 16 is preferably bent from a piece of suitably sized wire, it being bent to substantially U shape with an intermediate bend or loop 23 to form side portions 24 inclined upwardly and outwardly from the bend, and then each is bent inwardly at 25 to form upwardly and inwardly bent portions 26 between the bend or hump 25 and the free ends.

The retaining spring 17 is preferably made from a strip of sheet metal bent to substantially V shape, with an intermediate loop 27 and outwardly and upwardly inclined straight side portions 28, each being preferably rounded at its upper end, as shown at 29, and provided at its opposite edges a short distance from this end with the notches 30, the sides 28 also preferably being provided with a longitudinal bead 31 to impart greater stiffness to the side portions. Adjacent the bend or loop 27 one side is lanced, as shown at 32, to provide a tongue 33 which is connected to the side at 34, and in the opposite side is formed an opening 35, the tongue 33 being bent inwardly, and when the spring is bent to the desired shape the free end of this tongue 33 extends into the opening 35.

In assembling the device, the camming spring 16 is threaded through the retaining spring 17 through the space 36 between the bend 27 and the tongue 33. The tongue and the loop therefore retain this spring within the member 17 and prevent the two springs separating longitudinally, the loop or bend 23 of the spring 16 being normally seated in the bend 27 of the spring 17. Then the free ends of the two springs are inserted in the opening 18 in the plate 15 with the ends of the spring 17 opposite the notches 20 and the upwardly and inwardly inclined ends of the spring 16 located in the notches 19. In order to do this the ends of the spring 17 are pressed toward each other as are also the ends of the spring 16 so that both springs are tensioned, the rounding ends 29 assisting this operation, and as they are released the spring 17 expands so that the ends of this spring pass into the notches 20, the narrow portion 30a between the notches 30 receiving the edges of these notches 20 and sliding and being guided along the inclined portions 22 and past the points or lugs 21 into the inner portions or bottoms of the notches. It is preferred that the distance between the ends of the points 21 be slightly less than the neck or distance between the inner edges of the notches 30, so that some pressure is required to pass these elements into the notches, but when in the notches 20 the neck portions 30a between the notches 30 will be retained by the points 21 to prevent inadvertent separation of the retaining spring from the plate. The upper inclined portions 26 of spring 16 rest against the opposite ends of the notches 19 as the spring 16 has been tensioned, as above described.

In applying the device to the molding 12 the plate 15 is slid longitudinally into this molding with its opposite ends in the space 14 between the flanges 13 and the curved body or outer portion of the molding, as indicated in Fig. 1, until it comes to a position corresponding to the location of opening 11 in the body or fender 10, and then by merely inserting the free end of the clip in this opening and pressing the molding inwardly, the major portions of the springs 16 and 17 are forced through the opening, the edges of the opening acting on the inclined portions 24 with a camming action to force the free ends inwardly, and then as the bends or humps 25 pass through the opening the opposite edges of this opening through the resiliency of the spring have a camming action with the inwardly inclined portions 26 to draw the clip further through the opening, and as it does so draws the plate 15 toward the body or fender 10 and clamps the flanges 13 tightly against the surface of this body or fender. Thus these flanges through the camming action of the spring 16 on the edges of the opening 11 are firmly clamped between the plate 15 and the body or fender 10 to effectively and securely secure the molding to the body or fender, and the action of applying the molding to the fender after the clip plate has been inserted in this molding, is to merely force the two spring members through the opening in the body or fender.

In order to accommodate the clip for moldings 12 of different widths, all that is necessary is to provide plates 15 of different widths to correspond with the different widths of the molding. A series of these plates of different widths may be kept in stock, and then when it is desired to mount a molding of any different type or width, all that is necessary is to choose a plate of the proper width, apply the two springs 16 and 17 to this plate, then insert it in the molding and apply the molding to the body or the fender as above described. After the spring elements of the clip have been forced through the opening, camming action of the clip on the sides of the opening automatically holds it in place and automatically holds the molding tightly in place against the surface of the body or fender. The outer shape of the molding does not affect the clip as it acts on the longitudinal flanges.

Having thus set forth the nature of my invention, I claim:

1. A clip for attaching moldings including longitudinal flanges to automobiles, comprising a plate adapted to seat at opposite edges on said flanges and provided with an opening including two sets of recesses at opposite sides of the openings at substantially right angles to each other, a spring including connected side members each provided with notches in its side edges adjacent its free end to seat in a pair of said recesses, a second spring including inclined connected side arms inclined outwardly away from said connection and then bent inwardly to provide inwardly inclined end portions to extend into the other set of notches and by said inclined end portion to provide a camming action in an opening in a body to draw the plate toward the body and clamp the molding.

2. A clip for attaching moldings including spaced longitudinal flanges to automobiles, comprising a plate adapted to seat at opposite side edges on said flanges and provided with an opening, an attaching spring comprising connected side members connected at their free ends to opposite sides of said opening, a second spring connected to the first spring and comprising connected side members including inwardly inclined end portions extending at their free ends into the opening, and said inclined portions arranged to engage the edges of an opening in an automobile body member and by camming action thereon draw the plate toward the body to clamp the molding flanges against the body.

3. A clip for attaching moldings including longitudinal flanges to automobiles, comprising a plate adapted to seat at opposite side edges on said flanges and provided with an opening, a retaining spring comprising connected side members each provided with notches in its said edges adjacent its free end to receive edges of said opening to secure the spring to the plate, a camming spring comprising connected oppositely inclined side members bent intermediate their lengths to provide inwardly inclined end portions extending into said opening, said springs being connected at their opposite ends, and said inwardly inclined end portions of the camming spring arranged to engage the side edges of an opening in an automobile body and by camming action thereon draw the plate toward the body to clamp the flanges between the plate and said body.

4. A clip for attaching moldings including spaced longitudinal flanges to an automobile, comprising a plate adapted to seat at opposite side edges on said flanges and provided with an opening including a pair of recesses in opposite side edges thereof, an attaching spring comprising connected side members each having its free end portion seated in one of said recesses and shoulders engaging the plate to secure the spring thereto, and a camming spring connected to the first spring and comprising connected side members extending at their free ends into said opening in the plate between said notches and including opposed inwardly inclined camming portions adjacent said free ends.

5. A clip of the character described comprising a clamping plate provided with an opening including a pair of recesses in opposite side edges thereof, there being a tapered entrance to each recess and narrower than the width of the recess to provide retaining shoulders, an attaching spring comprising connected side members each having notches adjacent its free end providing a reduced neck to pass through said entrance into a recess and slightly wider than the entrance so as to be retained in the recess by said shoulders, and a camming spring mounted in the first spring and comprising connected side members extending at their free ends into the opening between said recesses and including oppositely inclined camming portions adjacent said free ends.

6. A clip of the character described comprising a clamping plate provided with an opening including two pairs of opposed recesses in the opposite edges thereof, an attaching spring comprising connected side members each provided with a reduced neck adjacent its free end to seat in one of the first pair of recesses to connect the spring to the plate, and a camming spring mounted in the first spring and comprising connected outwardly inclined side members bent inwardly at a distance from their free ends to provide oppositely and inwardly inclined end portions arranged with their free ends extending into the second pair of recesses.

JOHN STADLER.

No references cited.